United States Patent
Kanda et al.

(10) Patent No.: US 8,469,446 B2
(45) Date of Patent: Jun. 25, 2013

(54) SEAT BACK FRAMEWORK

(75) Inventors: Kenji Kanda, Tokyo (JP); Masaaki Honda, Tokyo (JP); Yosuke Karino, Tokyo (JP)

(73) Assignee: Tachi-S Co. Ltd., Tokyo (JP)

( * ) Notice: Subject to any disclaimer, the term of this patent is extended or adjusted under 35 U.S.C. 154(b) by 258 days.

(21) Appl. No.: 13/006,803

(22) Filed: Jan. 14, 2011

(65) Prior Publication Data

US 2012/0181825 A1    Jul. 19, 2012

(51) Int. Cl.
- *B60N 2/42* (2006.01)
- *B60R 21/00* (2006.01)
- *A47C 7/02* (2006.01)

(52) U.S. Cl.
USPC .............................. 297/216.14; 297/452.18

(58) Field of Classification Search
USPC ................ 297/216.14, 216.13, 452.18, 452.2
See application file for complete search history.

(56) References Cited

U.S. PATENT DOCUMENTS

| | | | |
|---|---|---|---|
| 4,679,854 A * | 7/1987 | Putsch et al. | 297/486 |
| 7,631,933 B2 * | 12/2009 | Fujita et al. | 297/216.12 |
| 7,758,114 B2 | 7/2010 | Yokota et al. | |
| 2007/0138855 A1 * | 6/2007 | Kespohl | 297/452.18 |
| 2011/0057498 A1 * | 3/2011 | Fujita et al. | 297/452.18 |

FOREIGN PATENT DOCUMENTS

JP    2009107571 A    5/2009

* cited by examiner

*Primary Examiner* — Milton Nelson, Jr.
(74) *Attorney, Agent, or Firm* — Browdy and Neimark, PLLC

(57) ABSTRACT

A shoulder receiving portion is defined in each of two lateral frame members of seat back framework of vehicle seat in order to receive two shoulder portions of seat occupant in the case of rear-end collision, prior to a seat occupant's back portion being moved close to an upper frame member of the seat back framework. The shoulder receiving portion is therefore arranged in an upper region of each of the two lateral frame members so as to project forwardly from a plane where the two lateral frame members lie, and the upper frame member is formed in substantially "inverted-U" shape and inclined backwardly distant from the two lateral frame members, This arrangement avoids unpleasant pressed touch to be given to the seat occupant's back portion in the case of rear-end collision and may prevent a great impact from being imparted to vertebrae of the seat occupant.

4 Claims, 2 Drawing Sheets

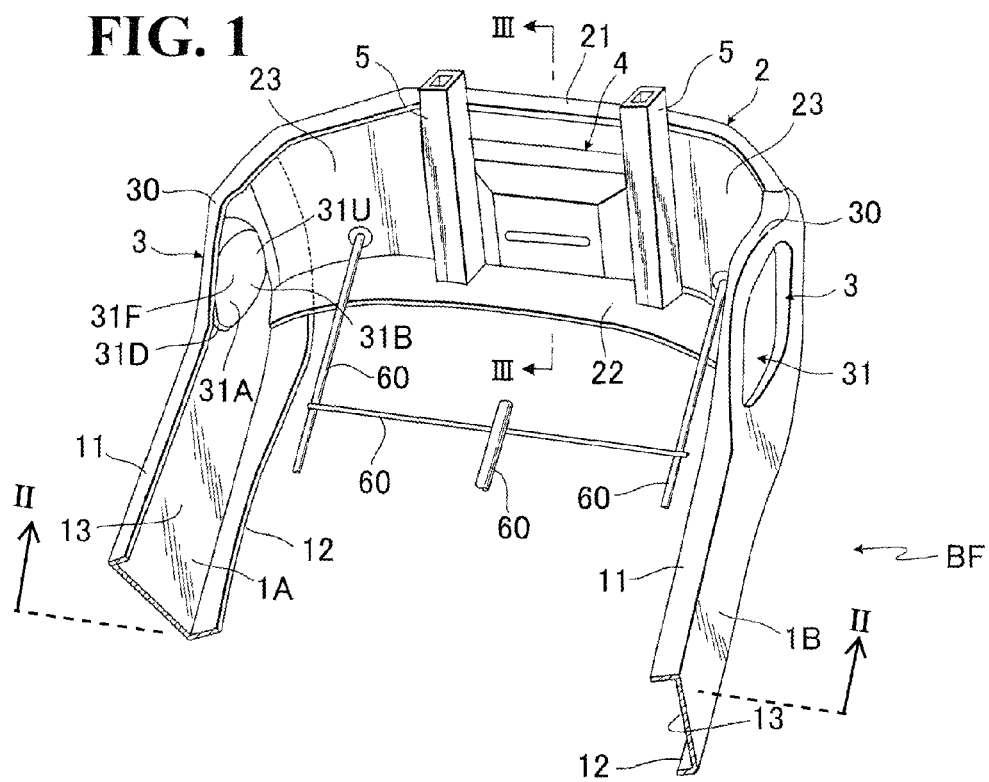
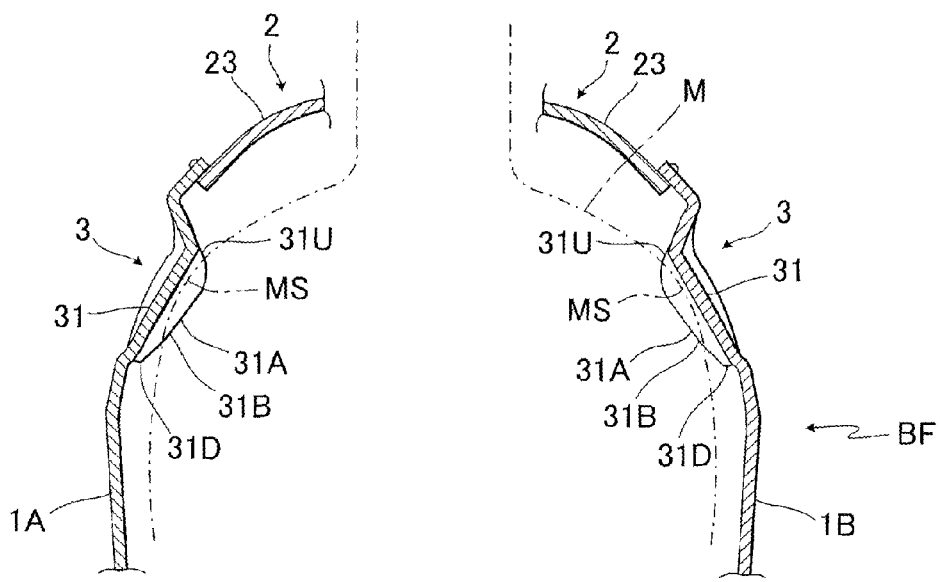

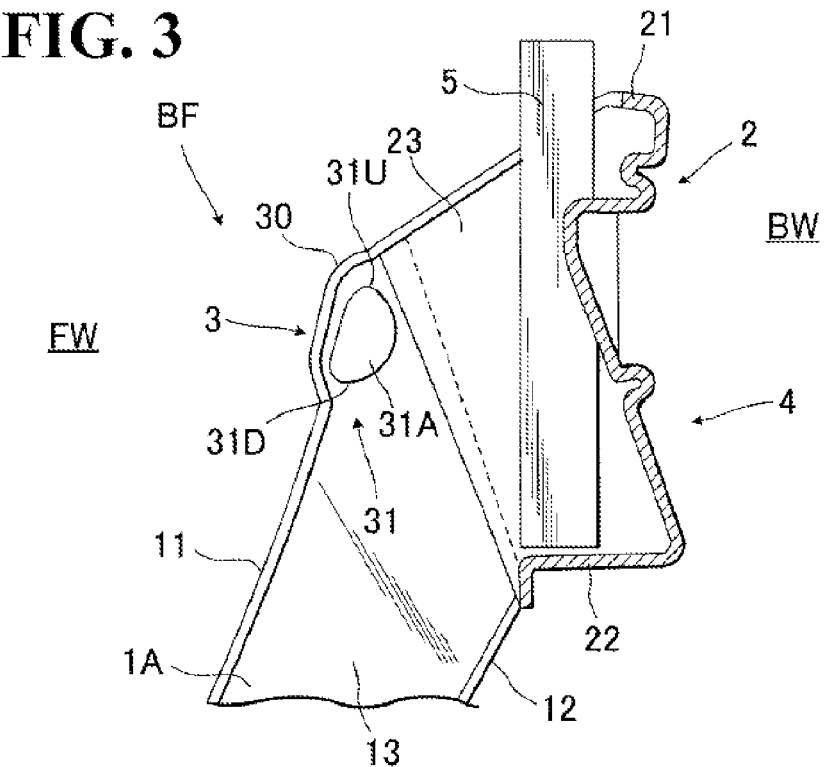
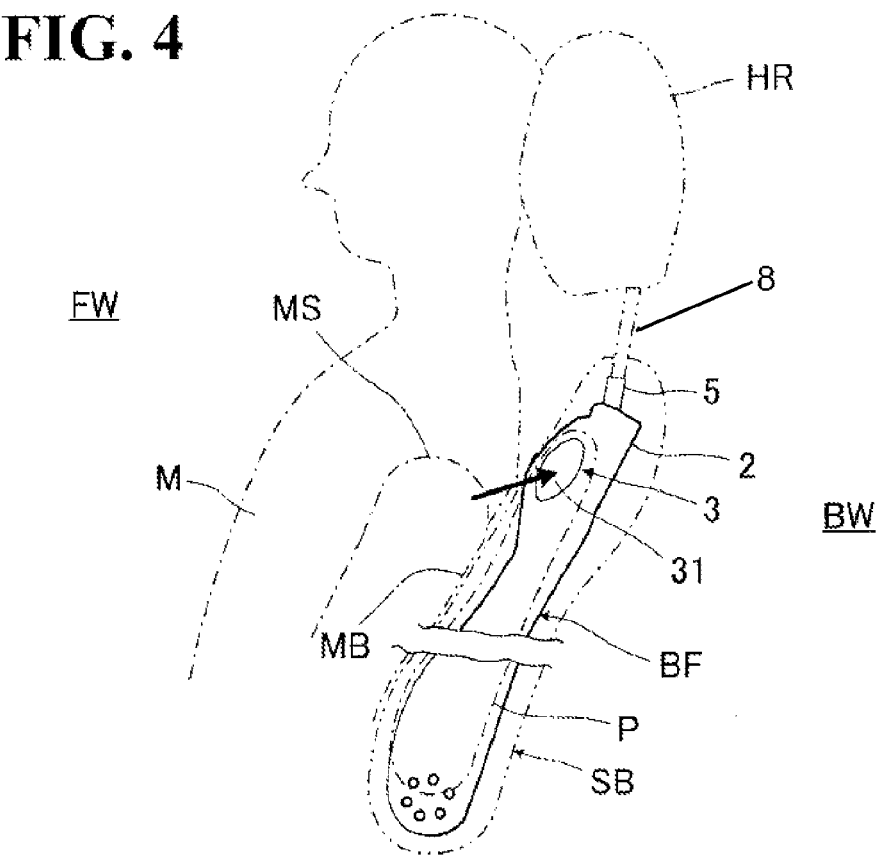

SEAT BACK FRAMEWORK

BACKGROUND OF THE INVENTION

1. Field of the Invention

The present invention relates to a seat back framework of vehicle seat so designed to protect a body portion of seat occupant on the seat against damages in the case of a rear-end collision. In particular, the invention is directed to a framework of seat back of vehicle seat which is effective for preventing undesired upward displacement of seat occupant's back portion to a point close to an upper frame member of the seat back framework in order to avoid unpleasant pressed touch to the seat occupant's back portion or protect his or her vertebrae against damage.

2. Description of Prior Art

Hitherto, there have been known various kinds of vehicle seats designed to protect a body of seat occupant on the seat against damage in the case of a rear-end collision.

In particular, to protect the vertebrae of seat occupant in the rear-end collision case, various kinds of arrangements are known and incorporated in the vehicle seats.

For example, the U.S. Pat. No. 7,758,114 teaches a seat back framework in combination with a movable headrest, which comprises: a pressure receiving member movably provided in a seat back frame at a point where a seat occupant's back portion is to be positioned; and a movable headrest operatively connected with the pressure receiving member. The pressure receiving member itself is formed in a resiliently deformable fashion and movable in the backward and upward directions. According thereto, when a rear-end collision occurs, the upper body portion of seat occupant is abruptly moved under inertia to the seat back, but softly received by the pressure receiving member which is in turn automatically moved in backward and upward directions. Therefore, the seat occupant's back portion rested on that pressure receiving member as well as the seat occupant's head are simultaneously displaced in the likewise backward and upward directions. With such arrangement, no great impact is imparted to the back portion of seat occupant, and thus the vertebrae of the seat occupant can be protected against damage.

On the other hand, known is a protection arrangement in seat back, which does not require the afore-stated pressure receiving member, but simply requires a disconnection of support members in the seat back. In this prior art, upon occurrence of rear-end collision, support members for supporting a back portion of seat occupant are deformed or disconnected from each other by a great load applied thereto, thereby preventing a great impact from being imparted to the back portion of seat occupant. For example, as disclosed from the Japanese Laid-Open Patent Publication No. 2009-107571 or JP 2009-107571 A, a spring support assembly of substantially flat configuration is disposed in a seat back frame, such that two lateral ends of the spring support assembly are releasably attached to the respective two lateral frame members of the seat back frame by means of releasable connecting members. According thereto, normally, the seat occupant' back portion is resiliently supported by that spring support assembly, but, when a rear-end collision occurs, upon receiving an excessive degree of backward load from the seat occupant, the connecting members are forcibly deformed and disconnected from the lateral frame members of seat back frame. By virtue of such disconnection of connecting members, the spring support assembly on which the seat occupant's back portion is rested is further displaced backwardly, which prevents a great impact from being imparted to the back portion of the seat occupant and therefore his or her vertebra can be protected against damage.

Incidentally, most of ordinary seat back frameworks, inclusive of the above prior-art seat back frameworks, is formed in a rectangular shape having an upper horizontal frame member, a pair of vertical lateral frame members and a lower horizontal frame member, with some resilient support members, such as zigzag spring members, being extended among and connected with those three frame members. Further, a foam padding is securely placed on that resilient support members. With such cushiony arrangement of seat back, a back portion of seat occupant is resiliently supported with a comfortable touch and protected against impact caused by normal vibrations and lurches during running of car or vehicle.

However, the foregoing prior-art seat backs have been with the problem that, when a rear-end collision occurs, an excessive great backward load is applied from the seat occupant under inertia to the seat back, at which moment, the back portion of the seat occupant is sunk deeply into the foam padding of the seat back in backward and upward directions, while being further displaced in the backward and upward directions as the resilient support members mentioned above are correspondingly warped. In other words, due to the smooth resiliency of seat back, without any hard obstacle therein, the vertebrae of the seat occupant is rapidly displaced backwardly and upwardly, and further such displacement is accelerated, with the result that the seat occupant's vertebrae is suddenly and abruptly brought to a point quite close to the upper horizontal frame member of seat back framework, which will give an unexpected great pressure to the seat occupant's back portion. This will make the seat occupant feel an unpleasant pressed touch on the seat back or may result in a damage of the vertebra of seat occupant.

SUMMARY OF THE INVENTION

In view of the above-stated drawbacks, it is a primary purpose of the present invention to provide an improved seat back framework which is of a much simplified structure for preventing excessive upward and backward displacement of seat occupant's back portion to a point close to an upper frame member of the seat back framework, to thereby avoid the aforementioned unpleasant pressed touch to the seat occupant's back portion and protect vertebrae of the seat occupant.

In order to achieve such purpose, a seat back framework in accordance with the present invention is basically comprised of;

an upper frame member disposed in an upper side of the seat back;

a first lateral frame member disposed in one of the two lateral sides of the seat back, the first lateral frame member having an upper region;

a second lateral frame member disposed in another of the two lateral side of the seat back, the second lateral frame member having an upper region;

a first shoulder receiving portion defined in the upper region of the first lateral frame so as to project from the first lateral frame in a direction forwardly of the seat back framework;

a second shoulder receiving portion defined in the upper region of the second lateral frame so as to project from the second lateral frame in a direction forwardly of the seat back framework;

the first and second shoulder receiving portions being adapted for receiving two shoulder portions of a seat occupant on the vehicle seat, respectively, when a back portion of the seat occupant is displaced backwardly and upwardly under inertia to and along the seat back in case of rear-end collision, thereby preventing the back portion of the seat occupant against further backward and upward displacement prior to the back portion being moved close to the upper frame member.

Preferably, each of the first and second shoulder receiving portions may have a recessed area defined therein, the recessed area having a surface formed substantially in conformity with localized upper and back regions of each of the two shoulder portions of the seat occupant. Such recessed area is to be buckled or deformed by an excessive great load being applied thereto from each of the two shoulder portions in the case of rear-end collision, thereby absorbing an impact to be imparted to the two shoulder portions.

Preferably, the upper frame member may be formed in a substantially "inverted-U" shape which is inclined backwardly of the seat back framework in a direction away from the upper region of each of the first and second lateral frame members.

Other various features and advantages will become apparent from reading of the description, hereinafter, with reference to the accompanied drawings.

BRIEF DESCRIPTION OF THE DRAWINGS

FIG. 1 is a partly broken perspective view showing a seat back framework in accordance with the present invention;

FIG. 2 is a sectional view of the seat back framework, which explanatorily shows an upper frame member and two smoulder receiving portions of the seat back framework;

FIG. 3 is a sectional view taken along the line III-III in the FIG. 1; and

FIG. 4 is a diagram for explanatorily showing how a seat occupant's shoulder portions is received and prevented by the shoulder receiving portions against upward and backward displacement to the upper frame member.

DETAILED DESCRIPTION OF PREFERRED EMBODIMENT OF THE INVENTION

Referring to FIGS. 1 to 4, there is illustrated a preferred mode of framework of seat back for vertebrae protection, generally designated by "BF", in accordance with the present invention. Hereinafter, the framework of seat back for vertebrae protection shall be referred to as "seat back framework" for the sake of simplicity in description.

As seen in FIG. 1, the seat back framework (BF) includes an upper frame member (2) and a pair of lateral frame members (1A) and (1B). The two lateral frame members (1A) and (1B) are at the respective upper end portions thereof welded to the two end portions of the upper frame member (2), respectively. Though not shown, a lower frame member is connected between two lower end portions respectively of the two lateral frame members (1A) and (1B), as known in the art.

It is to be noted that, hereinafter, the wording "forward" or "forwardly" refers to a forward side (FW) facing forwardly of the seat back framework (BF), whereas the wording "backward" or "backwardly" refers to a backward side (BW) facing backwardly of the seat back framework (BF).

As far as the present embodiment is concerned, the seat back framework (BF) is formed by a press working process, using a seat-metal material, into the illustrated configuration including an upper frame member (2) of substantially "inverted U" shape and a pair of lateral frame members (1A) and (1B).

The pair of lateral frame members (1A) and (1B) are each formed by the press working process into the shown configuration which has, defined therein, a flat wall portion (13), a front flange portion (11), and a rear flange portion (12). For both of the two lateral frame members (1A) (1B) in common, it is observed from FIGS. 1 and 2 that the front flange portion (11) is formed integrally in a forwardly facing edge of the lateral frame member (1A or 1B) so as to extend at substantially a right angle therefrom in a direction inwardly of the seat back framework (BF), whereas likewise, the rear flange portion (12) is formed integrally in a backwardly facing edge of the lateral frame member (1A or 1B) so as to extend at substantially a right angle therefrom in a direction inwardly of the seat back framework (BF). Such formation of the two flange portions (11) (12) serves to reinforce the sheet-metal structure of each of the two lateral frame members (1A) (1B) to provide a required rigidity therein.

Designations (60) denote resilient support members, such as the shown spring assembly formed by a plurality of wire spring members, which are extended in and connected with the above-stated frame members of seat back framework (BF) and adapted for resiliently supporting a foam padding (P) (see FIG. 4) as well as a back portion (MB) of a seat occupant (M).

Designations (5) denote a pair of spaced-apart headrest stay holders fixedly attached to a midway portion of the upper frame member (2) as seen in FIG. 1. Each of the two headrest stay holders (5) is of a substantially tubular shape having a though-bore formed therein, and therefore, as understandable from FIG. 4, a pair of stays (at 8) of headrest (HR) are slidably inserted and supported in those two holders (5), respectively, in a known manner.

As indicated in FIG. 4, the seat back framework (BF) is upholstered properly, using a trim cover assembly (not shown) and foam padding (p), to form a seat back (SB), as known in the art.

In accordance with the seat back framework of the present invention, the foregoing substantially inverted-U-shaped configuration of upper frame member (2) and a pair of shoulder receiving portions (3) and (3) to be set forth later are a principal part of the present invention which serves the purposes to be set forth later, including protection of vertebrae of seat occupant.

The illustrated seat back framework (BF) has the resilient support members (60) and foam padding (P) provided inwardly thereof to resiliently support the back portion (MB) of seat occupant (M), and therefore, as previously stated in the description of prior art, it has been noticed that, when a rear-end collision occurs, the seat occupants back portion (MB) is sunk deeply into the foam padding (P) of the seat back (SB) in backward and upward directions and continues to be displaced in the likewise backward and upward directions as the resilient support members (60) are warped in the same directions by a great load applied thereto from the seat occupant (M). Namely, due to such smooth resiliency of seat back (SB) without any hard obstacle therein, the seat occupant' back portion (MB) is rapidly displaced backwardly and upwardly, and such displacement of seat occupant's back portion (MB) is accelerated, so that the seat occupant's vertebrae is suddenly and abruptly brought to a point quite close to the upper frame member (2), which will make the seat occupant (M) feel an unpleasant pressed touch at his or her upper region of back portion (MB) or may possibly result in his or her vertebra being damaged.

With the foregoing problem in view, according to the shown embodiment of seat back framework (BF) in the present invention, (i) the upper frame member (2) is formed in an "inverted U" shape, as stated earlier, which is inclined backwardly relative to and distant from the two lateral frame members (1A) (1B), and (ii) a pair of shoulder receiving portions (3) and (3) of impact absorption type are defined in the left- and right-side lateral frame members (1A) and (1B), respectively, so as to project forwardly of those two lateral frame members.

Specifically, the inverted-U-shaped and backwardly-inclined upper frame member (2) has, defined therein, a pair of right- and left-side arcuate corner portions (23) and (23) which are also curved or inclined backwardly in a direction from the lower end region thereof to the upper end region thereof. Further, as seen in FIGS. 1 and 2, a first flange portion (21) is formed integrally in one edge of the upper frame member (2) so as to project at substantially a right angle therefrom in a direction inwardly of the seat back framework (BF), whereas likewise, a second flange portion (22) is formed integrally in another opposite edge of the upper frame member (2) so as to project at substantially a right angle therefrom in a direction inwardly of the seat back framework (BF). Those first and second flange portions (21) (22) are adapted for reinforcing the sheet-metal structure of upper frame member (2) to provide a required rigidity to the upper frame member (2) itself.

As understandable from FIGS. 1 and 3, the afore-stated two arcuate corner portions (23) (23) are inclined backwardly relative to and distant from the two vertically extending lateral frame members (1A) (B), whereupon the upper frame member (2) per se extends upwardly away from an ordinary position of a known horizontal upper frame member of seat back framework, and that the midway flat wall portion of the upper frame member (2) between the two arcuate corner portions (23) (23) is situated at a rearmost point of the seat back framework (BF). Hence, it is seen that the two headrest stay holders (5) and (5), fixed to that midway flat wall portion of upper frame member (2), are also disposed at a rearmost point of the seat back framework (BF) and therefore situated backwardly remote from the two lateral frame members (1A) (1B).

Designation (4) denotes an upward-slippage prevention portion for preventing the seat occupant's back portion (MB) against upward slippage and dislocation. In brief, such upward-slippage prevention portion (4) is integrally formed in the afore-said midway flat wall portion of upper frame member (2) and has a sloped region for receiving the seat occupant's back portion which is to be slipped or dislocated on and along the seat back under inertia when a rear-end collision occurs and thereby preventing an undesired upward slippage or dislocation of that seat occupant's back portion which may result in damage of his or her neck or cervical vertebrae. But, this upward-slippage prevention portion (4) is not the subject matter of the present invention and therefore, further description thereon is omitted.

On the other hand, the pair of shoulder receiving portions (3) and (3) of impact absorption type are each defined in the upper end region of the corresponding lateral frame member (1A or 1B) of seat back framework (BF) in the proximity of a point where a seat occupant's shoulder portion (MS) is to be normally positioned.

A specific description will now be given as to the structure and functions of those two shoulder receiving portions (3) and (3). But, since the left- and right-side shoulder receiving portions (3) and (3) are identical in shape and structure to each other, only one left-side shoulder receiving portion (3) will be specifically described for the sake of simplicity in description. Hence, it is to be understood that a detailed description hereinafter will also apply to another right-side shoulder receiving portion (3) and that all like designations to be used for the left-side shoulder receiving portion (3) correspond to all like designations for the right-side shoulder receiving portion (3).

As shown, the shoulder receiving portion (3) is defined integrally in the upper end region of the lateral frame member (1A) and projects in a direction forwardly of the seat back framework (BF). Formation of that shoulder receiving portion (3) is done during a press working process for forming the lateral frame member (1A) or the seat back framework (BF), such that, prior to commencement of press working process, a predetermined area corresponding to the shoulder receiving portion (3) is set in the upper end region of the lateral frame member (1A) at a location remote a predetermined distance from a point where the seat occupant's shoulder portion (MS) is to be normally positioned when the seat occupant (M) sits on the seat, with his or her back portion (MB) being normally rested on the seat back (SB), and thereafter, the lateral frame member (1A) is subjected to press working process, such that the afore-said predetermined area in the upper end region of lateral frame member (1A) is formed into the illustrated configuration of shoulder receiving portion (3) which protrudes forwardly from the forwardly facing end (at the front flange portion (11)) of the lateral frame member (1A), with a recessed main area (31) defined therein, wherein the recessed main area (31) is so configured to receive a shoulder portion (MS) of seat occupant (M) and deformable by a great load applied thereto from the seat occupant's shoulder portion (MS), as will be described later.

Designation (30) denotes a front flange portion formed in the shoulder receiving portion (3). Naturally, due to the press working process stated above, the front flange portion (30) extends integrally and continuously from the previously stated front flange portion (11) of the lateral frame member (1A). This front flange portion (30) serves to reinforce the shoulder receiving portion (3) as well as the peripheral regions of the shoulder receiving area (31), in cooperation with the rear flange portion (12).

The above-stated recessed main area (31) is depicted as being recessed in a direction inwardly of the lateral frame member (1A) and having a sloped concave surface (31A) which thus projects inwardly of the seat back framework (BF). In this regard, it is important that, in the press working process of forming the shoulder receiving portion (3), the sloped concave surface (31A) should be formed substantially in conformity with localized upper and back areas of the seat occupant's shoulder portion (MS) (inclusive of a shoulder joint portion between his or her shoulder and arm) which are to be contacted with that sloped concave surface (31A) in the case of rear-end collision. Namely, referring to FIGS. 1 and 2 in conjunction with FIG. 4, it is to be seen that:—

(i) The sloped concave surface (31A) becomes progressively higher, while being arcuately curved in a direction inwardly of the seat back framework (BF), as it proceeds from the lower (or backward) region (31 B) thereof towards the upper region (31 U) thereof, so as to substantially receive a localized upper area of seat occupant's shoulder portion (MS) in conformity therewith in the case of rear-end collision.

(ii) Further, the sloped concave surface (31A) becomes progressively higher, while being arcuately curved in a direction forwardly of the seat back framework (BF), as it proceeds from the forward region (31F) thereof towards the backward region (31B) thereof, so as to substantially receive a localized back area of seat occupant's shoulder portion (MS) in conformity therewith in the case of rear-end collision.

Otherwise stated, the upper region (31U) of the sloped concave surface (31A) projects arcuately in a direction inwardly of the seat back framework (BF), while facing downwards, with respect to the opposite lower region (31D) thereof, whereas the backward region (31B) of the sloped concave surface (31A) projects arcuately in a direction inwardly of seat back framework (BF), while facing forwards, with respect to the opposite forward region (31F) thereof.

In this context, it is observed that both two shoulder receiving portions (3) project forwardly of the upper region of seat back frame (BF), and the reason therefor is based on the idea that, when the upper body portion of seat occupant (M) is displaced backwardly and upwardly under inertia towards the seat back (SB), the two shoulder portions (MS) of the seat occupant (M) are first received and blocked by the respective two shoulder receiving portions (3) against unnecessary upward displacement in advance prior to the seat occupant's back portion (MB) being moved upwardly and backwardly towards the upper frame member (2), thereby preventing the above-explained undesired displacement of seat occupant's upper region of back portion (MB) or vertebrae to a point close to the upper frame member (2).

In addition, the recessed main area (31), which is recessed inwardly of the seat back frame (BF) as understood from the above description, is so designed to be buckled or deformed in a direction outwardly of the seat back frame (BF) upon an excessive great load being applied thereto from the seat occupant's shoulder portion (MS) in the case of rear-end collision, thereby absorbing most of corresponding great impact to be directly imparted to the shoulder portions (MS) and thus protecting the shoulder portions against damage. For that purpose, the thickness of the recessed main area (31) may be reduced to an appropriate and tolerable degree as compared with the thickness of the lateral frame member (1A), taking into account a required rigidity of that recessed main area (31) and using a suitable sheet-metal material of the lateral frame member (1A).

Here, it is be noted that a whole of the shoulder receiving portion (3), formed from a sheet metal, expands in both vertical and forward directions in a coplanar relation with the lateral frame member (1A or 1B) which is also formed from a sheet metal and expands in both vertical and forward directions, so that, irrespective of the above-stated buckling or deformation of the recessed main area (31) thereof, the shoulder receiving portion (3) itself is provided with a sufficient rigidity to withstand upward and backward great load applied thereto from the seat occupant's back portion (MB) in the case of rear-end collision. This can also be comprehended from the fact that the recessed main area (31) is buckled or deformed only in a direction transversely of both shoulder receiving portion (3) and lateral frame member (1A or 1B), and thus not deformed in any of the upward and backward directions along with those shoulder receiving portion (3) and lateral frame member (1A or 1B).

As indicated by the two-dot chain lines in FIG. 4, the above-constructed seat back frame (BF) is properly upholstered to constitute a seat back (SB), using a trim cover assembly (not shown) and the foam padding (4). In this regard, it is to be seen that the upper portion of the foam padding (P) overlies and contacts both of the foregoing two shoulder receiving portions (3) (3) and therefore, normally, both two shoulder portions (MS) of seat occupant (M) are resiliently kept away by the foam padding (P) from the respective two shoulder receiving portions (3) and normally retained out of contact therewith. Hence, the seat occupant (M) normally does not feel any objectionable hard touch at his or her both two shoulder portions (MS), even when being subjected to vibrations and lurches during normal running of car or vehicle.

With the above-described arrangement of shoulder receiving portion (3) and upper frame member (2), referring to FIGS. 2 and 4, when a rear-end collision occurs, the upper body portion of seat occupant (M) is displaced backwardly and upwardly under inertia and pressed against the seat back (SB). At this moment, the seat occupant's back portion (MB) is sunk into the seat back or foam padding (P) and further continues to be displaced in the backward and upward directions as the resilient support members (60) (see FIG. 1) are warped in the likewise backward and upward directions. As a result thereof, as indicated by the arrow in FIG. 4, the two shoulder portions (MS) of the seat occupant (M) are borough to contact with the respective two shoulder receiving portions (3) via a correspondingly compressed layer of the foam padding (P), whereby the seat occupant's back portion (MB) is prevented against further upward and backward displacement close to the upper frame member (2), so that the seat occupant (M) does not feel any unpleasant pressed touch at his or her back portion (MB) and also no great impact is imparted to his or her vertebrae.

Additionally, by virtue of the upper frame member (2) being arcuate and inclined backwardly of the seat back frame (BF), a sufficient distance is secured between the seat occupant's two shoulder portions (MS) and that upper frame member (2), to the extent that the shoulder portions (MS) do not reach the upper frame member (2). Further, both two headrest stay holders (5) (5) are disposed at a rearmost point in the seat back (SB) and thus distant backwardly from both two shoulder receiving portions (3), which in effect insures to prevent an upper part of the seat occupant's upper shoulder portions (MS), including his or her neck portion, from being contacted with the hard headrest stay holders (5), so that the upper region of vertebrae of the seat occupant (M) is not damaged by the headrest stay holders (5) in the case of rear-end collision.

Accordingly, in the present invention, it is possible to prevent a great impact from being imparted to a back portion of seat occupant as well as an upper portion thereof in the case of rear-end collision, thereby protecting his or her vertebrae against damages.

Furthermore, in addition to the above-described effect for preventing upward and backward displacement of the seat occupant's back portion, the shoulder receiving portion (3) and the sloped concave surface (31) defined therein can be easily formed at one time by a press working process in each of the two lateral frame members (1A) and (1B), and also, the upper frame member (2) can be easily formed into the backwardly-inclined and inverted-U-shaped configuration by press working process. This greatly simplifies the structure of seat back frame (SB) and requires no other separate parts, thus reducing a time for assembling the seat back (SB) as well as costs involved therein.

The above descriptions have been given only for the instance where is formed by a press working process, using the seat-metal frame. But, in the case of the seat back frame (BF) being formed from tubular frame members, (i) a tubular upper cross frame portion thereof may be curved into a backwardly-inclined and inverted-U-shaped configuration similar to the illustrated upper frame member (2) and (ii) a predetermined area in an upper end region of each of two lateral tubular frame members be curved into a substantially circular configuration similar to the contour of the afore-said shoulder receiving portion (3) in order to achieve the above-described effects.

While having described the present invention thus far, it is to be understood that the invention is not limited to the illustrated embodiment, but any modification, addition and replacement may be applied thereto, without departing from the scopes of the appended claims.

What is claimed is:

1. A seat back framework in a seat back of a vehicle seat, wherein said seat back includes an upper side and two lateral sides, comprising:
    an upper frame member disposed in an upper side of said seat back;
    a first lateral frame member disposed in one of said two lateral sides of said seat back, said first lateral frame member including a flat upper region defined therein;
    a second lateral frame member disposed in another of said two lateral sides of said seat back, said second lateral frame member including a flat upper region defined therein;
    a first shoulder receiving portion defined in said flat upper region of said first lateral frame member so as to project therefrom in a direction forwardly of the seat back framework;
    a second shoulder receiving portion defined in said flat upper region of said second lateral frame member so as to project therefrom in a direction forwardly of the seat back framework;
    said first and second shoulder receiving portions being adapted for receiving two shoulder portions of a seat occupant on the vehicle seat, respectively, when a back portion of said seat occupant is displaced backwardly and upwardly under inertia to and along said seat back in case of rear-end collision, thereby preventing said back portion of said seat occupant against further backward and upward displacement prior to said back portion being moved close to said upper frame member.

2. The seat back framework as claimed in claim 1, wherein each of said first and second shoulder receiving portions has a recessed area defined therein, said recessed area having a surface formed and adapted for receiving localized upper and back regions of each of said two shoulder portions of said seat occupant, and wherein said recessed area is to be buckled or deformed by an excessive great load being applied thereto when said each of said two shoulder portions impact said recessed area in the case of rear-end collision.

3. The seat back framework as claimed in claim 1, wherein said upper frame member is formed in a substantially "inverted-U" shape which is inclined backwardly of said seat back framework in a direction away from said upper region of said each of said first and second lateral frame members.

4. The seat back framework according to claim 3, wherein said upper frame member has, defined therein, an area to which at least one headrest stay holder is fixedly attached, so that said at least one headrest stay holder is disposed backwardly remote from said upper region of each of said first and second lateral frame members.

\* \* \* \* \*